3,746,656
CATALYST FOR THE PRODUCTION OF
ACRYLONITRILE
Tatsuo Shiraishi, Shinkichi Shimizu, and Hiroshi Ichihashi, Niihama, Japan, assignors to Sumitomo Chemical Company, Limited, Osaka-shi, Osaka-fu, Japan
No Drawing. Filed May 28, 1971, Ser. No. 148,165
Claims priority, application Japan, May 29, 1970,
45/46,667
Int. Cl. B01j 11/82
U.S. Cl. 252—437        5 Claims

ABSTRACT OF THE DISCLOSURE

In the production of acrylonitrile by a vapor phase reaction of propylene, ammonia and oxygen at an elevated temperature, a process which comprises contacting propylene, ammonia and oxygen with a catalyst composition comprising a catalyst system of the formula:

$$Tl_aP_bMo_cFe_dBi_eX_fO_g$$

wherein X represents one or more of the metals, Ni, Mg and Co, and $a, b, c, d, e, f$ and $g$ represent respectively the relative number of atoms of each component; provided that when $c$ is 12, $a$ is 2 or less, but not 0; $b$ is 0 to 5; $d$ is 0.1 to 5; $e$ is 0.1 to 5; $f$ is 2 to 15; and the value of $g$ depends on the number of the other atoms and is usually from 38.3 to 81.5.

---

The present invention relates to a process for producing acrylonitrile. More particularly, the invention relates to a process for selective production of acrylonitrile by the vapor phase reaction of propylene, ammonia and oxygen in the presence of a specific catalyst system.

For the production of acrylonitrile by ammoxidation of propylene, there have been proposed a variety of catalyst systems, some examples of these systems are as follows: a catalyst system comprising bismuth, tin or antimony salt of molybdic acid or phosphomolybdic acid, or bismuth phosphowolframate (Japanese patent publication No. 5,870/1961); a catalyst system comprising the oxides of molybdenum, phosphorus, bismuth and iron (Japanese patent publication No. 17,967/1963); a catalyst system comprising the oxides of copper and antimony (Japanese patent publication No. 14,093/1966); a catalyst system comprising the oxides of bismuth and tungsten (Japanese patent publication No. 27,402/1968); a catalyst system comprising the oxides of uranium and antimony (Japanese patent publication No. 24,367/1965), etc. However, some drawbacks are seen in these known catalyst systems.

One of the drawbacks is the production of acrylonitrile in a relatively low selectivity. Thus, there are by-produced carbon monoxide, carbon dioxide, acrolein, acetaldehyde, acetonitrile, hydrogen cyanide and the like, in large amounts, which reduce the yield of acrylonitrile. Moreover, the production of such by-products results not only in the loss of the starting materials, but also in the difficult recovery of the desired acrylonitrile.

Another drawback is the low yield of acrylonitrile in each pass of propylene feed. This is probably due to the low conversion of propylene or, even if the conversion of propylene may be high, the low selectivity to acrylonitrile.

A further drawback of these known systems is the production of excessively oxidized by-products such as carbon monoxide and carbon dioxide, which makes the control of heat difficult. The side reactions are most exothermic than the main reaction, and a larger amount of a diluent is required to control the heat generating therefrom.

As a result of extensive studies, it has been found in accordance with this invention that the use of a specific catalyst system comprising thallium in the ammoxidation of propylene will afford acrylonitrile with a high selectivity in an excellent yield per each pass. It has also been found that this use of this system suppresses considerably the formation of undesirable by-products, especially carbon monoxide and carbon dioxide, and makes it possible to carry out the reaction at a relatively low temperature. The present invention is based on these findings.

According to the present invention, the vapor phase reaction of propylene, ammonia and oxygen is carried out in the presence of a catalyst system corresponding to the formula: $Tl_aP_bMo_cFe_dBi_eX_fO_g$ wherein X represents one or more metals selected from the group consisting of Ni, Mg and Co, and $a, b, c, d, e, f$ and $g$ represent, respectively, the number of atoms of each component; provided that when $c$ is 12, $a$ is 2 or less (preferably 0.01 to 1.0), but not 0; $b$ is 0 to 5 (preferably 0.01 to 3.0); $d$ is 0.1 to 5; $e$ is 0.1 to 5 (preferably 0.5 to 3.0); $f$ is 2 to 15 (preferably 2 to 12); and $g$ is decided or determined depending on the number of the other atoms and is usually from 38.3 to 81.5 (preferably 38.9 to 69.0).

The starting materials in the ammoxidation of this invention are propylene, ammonia and oxygen. The propylene is not necessarily required to be highly pure and may contain, for instance, some amounts of low molecular weight saturated hydrocarbons such as propane. As the oxygen source, there may be used pure oxygen gas, air enhanced or not in the oxygen concentration or any other free oxygen-containing gas. From the economical viewpoint, the use of air is preferred. In order to increase the selectivity to acrylonitrile, steam may be introduced into the reaction system, but this introduction is not necessarily required. If desired, an appropriate inert gas such as nitrogen, carbon dioxide, or argon, may be used as a diluent.

For preparation of the catalyst system, there may be employed metallic thallium and thallium compounds (e.g. thallium nitrate, thallium carbonate, and thallium chloride), molybdenum compounds (e.g. ammonium molybdate, molybdenum oxide, molybdic acid and phosphomolybdic acid), phosphorus compounds (e.g. phosphoric acid, ammonium phosphate, and phosphorus pentoxide), iron compounds (e.g. ferric nitrate, and ferric chloride), bismuth compounds (e.g. bismuth nitrate, bismuth chloride and bismuth oxide), magnesium compounds (e.g. magnesium nitrate, and magnesium chloride), cobalt compounds (e.g. cobalt nitrate, and cobalt chloride) and nickel compounds (e.g. nickel nitrate and nickel chloride).

The catalyst system may be used as such but it is advantageously incorporated with a suitable carrier (e.g. silica, alumina, silicon carbide, titanium oxide). The amount of the carrier is varied with its kind and may be usually less than 90% by weight, preferably from 5 to 90% by weight, of the catalyst composition. The catalyst composition is normally formed in tablets or granules on use.

The preparation of the mixed oxide catalyst composition of this invention may be executed by a per se conventional procedure. For instance, a thallium salt, an iron salt, a bismuth salt, a phosphorus compound and one or more of a magnesium salt, a cobalt salt and a nickel salt are added to an aqueous solution of a molybdate such as ammonium molybdate; the resulting slurry is admixed with a carrier material and evaporated to dryness; and the resultant cake is calcined at an elevated temperature in atmosphere and, after cooling, crushed and shaped into pellets or granules.

The production of acrylonitrile using the catalyst composition of the invention may be effected by a fluidized bed process or a fixed bed process. The reaction temperature is associated with the kind of the catalyst composition and usually is from about 300 to about 520° C., preferably from about 350° C. to about 480° C. The reaction is usually carried out at a nearly atmospheric pressure (preferably about 0.7 to about 5 atm.). The molar ratio of the starting materials may be propylene:ammonia:oxygen=1.0:0.7–2.5 (favorably 1.0–2.0): 1.0–5.0 (favorably 1.5–3.5). When steam is used, it may be usually not more than about 18 mol, favorably from about 1 to about 10 mol per 1 mol of propylene. The space velocity of the reactants is ordinarily from about 50 to about 2000 hr.$^{-1}$, preferably from about 100 to about 1000 hr.$^{-1}$.

By the use of the catalyst system of the present invention, the desired acrylonitrile can be produced in a high selectivity and an excellent yield per each pass with little by-production of carbon monoxide and carbon dioxide. In addition, the life of the catalytic activity is sufficiently and satisfactorily long and the thallium in the catalyst composition is never volatilized during the reaction.

A number of preferred embodiments of the present invention are shown in the following examples.

EXAMPLE 1

Nickel nitrate (32.72 g.), cobalt nitrate (29.10 g.), ferric nitrate (5.05 g.) and thallium nitrate (3.33 g.) are dissolved in distilled water (300 ml.) and bismuth nitrate (12.13 g.) is dissolved in dilute nitric acid (6% by weight; 25 ml.). These solutions are combined together. The resultant mixture is added to a solution of ammonium molybdate (52.98 g.) in dilute aqueous ammonia (3.5% by weight; 300 ml.) containing phosphoric acid (85% by weight; 0.23 g.). To the resultant slurry dispersion, silica sol (SiO$_2$, 20% by weight; 100 ml.) is added, and the mixture is evaporated to dryness until the generation of nitrogen dioxide is ceased. The residue is calcined at 300° C. for 3 hours (1st calcination), cooled and crushed. The obtained powder is tableted and calcined at 525° C. for 6 hours (2nd calcination) to give a catalyst composition, of which the active components correspond to the formula:

$$Tl_{0.5}P_{0.08}Mo_{12}Fe_{0.5}Bi_1Ni_{4.5}Co_4O_{47.7}$$

(wherein the carrier is omitted).

In a glass-made reaction tube of 10 mm. in inner diameter, the above obtained catalyst composition (6.3 ml.) is charged and heated up to 430° C. Then, a gaseous mixture of propylene, ammonia, oxygen, steam and nitrogen (1.0:1.2:3.0:4.9:7.6 in molar ratio) is introduced into the reaction tube at a space velocity of 476 hr.$^{-1}$, whereby acrylonitrile is produced.

The conversion of propylene is 91% and the selectivities to acrylonitrile, carbon monoxide and carbon dioxide are respectively, 85.5%, 2.5% and 3.8%, calculated according to the following equations:

Conversion of propylene (%)
$$= \frac{\text{Reacted propylene (mol)}}{\text{Feed propylene (mol)}} \times 100$$

Selectivity (%)
$$= \frac{\text{Weight of carbon atoms in product}}{\text{Weight of carbon atoms in reacted propylene}} \times 100$$

EXAMPLE 2

In the same manner as in Example 1, except that magnesium nitrate (25.64 g.) is used in place of cobalt nitrate and the amounts of ferric nitrate and thallium nitrate are changed, respectively to 8.08 g. and 1.33 g. a catalyst composition of which the active components correspond to the formula: $Tl_{0.2}P_{0.08}Mo_{12}Fe_{0.8}Bi_1Ni_{4.5}Mg_4O_{47.7}$ is prepared.

As in Example 1, a gaseous mixture of propylene, ammonia, oxygen, steam and nitrogen (1.0:1.2:3.1:4.8:7.4 in molar ratio) is contacted with the above obtained catalyst composition (5.8 ml.) at 410° C. at a space velocity of 580 hr.$^{-1}$, whereby acrylonitrile is produced. The conversion of propylene is 99.7% and the selectivities to acrylonitrile, carbon monoxide and carbon dioxide are, respectively, 83.4%, 2.1% and 6.1%.

EXAMPLE 3

In the same manner as Example 1, except that cobalt nitrate is not used and the amounts of nickel nitrate, ferric nitrate and thallium nitrate are changed, respectively, to 61.80 g., 8.08 g. and 1.33 g., a catalyst composition of which the active components correspond to the formula: $Tl_{0.2}N_{0.08}Mo_{12}Fe_{8.0}Bi_1Ni_{8.5}O_{47.7}$ is prepared.

As in Example 1, a gaseous mixture of propylene, ammonia, oxygen, steam and nitrogen (1.0:1.1:2.9:3.8:6.8 in molar ratio) is contacted with the above-obtained catalyst composition (6.1 ml.) at 430° C. at a space velocity of 620 hr.$^{-1}$, whereby acrylonitrile is produced. The conversion of propylene is 100% and the selectivities to acrylonitrile, carbon monoxide and carbon dioxide are, respectively, 80%, 5.0% and 6.2%.

EXAMPLE 4

In the same manner as in Example 1, except that magnesium nitrate (54.49 g.) is used in place of nickel nitrate, cobalt nitrate is not used, and the amounts of ferric nitrate and thallium nitrate are changed, respectively to 10.10 g. and 1.33 g., a catalyst composition of which the active components correspond to the formula:

$$Tl_{0.2}P_{0.08}Mo_{12}Fe_1Bi_1Mg_{8.5}O_{48.0}$$

is prepared.

As in Example 1, a gaseous mixture of propylene, ammonia, oxygen, steam and nitrogen (1.0:1.1:2.9:3.8:6.8 in molar ratio) is contacted with the above-obtained catalyst composition (6.1 ml.) at 430° C. at a space velocity of 394 hr.$^{-1}$, whereby acrylonitrile is produced. The conversion of propylene is 90% and the selectivities to acrylonitrile, carbon monoxide, and carbon dioxide are, respectively, 78%, 4.6% and 4.3%.

EXAMPLE 5

In the same manner as in Example 1, except that nickel nitrate is not used, the amounts of cobalt nitrate, ferric nitrate, and thallium nitrate are changed, respectively, to 61.84 g., 10.10 g. and 1.33 g. and the calcination after molding is executed at 550° C., a catalyst composition of which the active components correspond to the formula: $Tl_{0.2}P_{0.08}Mo_{12}Fe_1Bi_1Co_{8.5}O_{48.0}$ is prepared.

As in Example 1, a gaseous mixture of propylene, ammonia, oxygen, steam and nitrogen (1.0:1.1:3.0:4.8:7.5 in molar ratio) is contacted with the above-obtained catalyst composition (5.9 ml.) at 440° C. at a space velocity of 518 hr.$^{-1}$, whereby acrylonitrile is produced. The conversion of propylene is 90.5% and the selectivities to acrylonitrile, carbon monoxide and carbon dioxide are respectively 84%, 3.0% and 3.8%.

EXAMPLE 6

In the same manner as in Example 1, except that magnesium nitrate (25.64 g.) is used in place of cobalt nitrate, and phosphoric acid (85% by weight; 0.86 g.) is added, a catalyst composition of which the active components correspond to the formula:

$$Tl_{0.5}P_{0.3}Mo_{12}Fe_{0.5}Bi_1Ni_{4.5}Mg_4O_{48.25}$$

is prepared.

As in Example 1, a gaseous mixture of propylene, ammonia, oxygen, steam and nitrogen (1.0:1.7:3.0:7.5:6.5 in molar ratio) is contacted with the above-obtained catalyst (6.2 ml.) at 410° C. at a space velocity of 560 hr.$^{-1}$, whereby acrylonitrile is produced. The conversion of propylene is 90% and the selectivities to acrylonitrile, carbon monoxide, and carbon dioxide are, respectively 86%, 1.7% and 4.0%.

REFERENCE EXAMPLE

In the same manner as in Example 3, except that thallium nitrate is not used, a catalyst composition of which the active components correspond to the formula: $P_{0.08}Mo_{12}Fe_{0.8}Bi_1Ni_{8.5}O_{50.4}$ is prepared.

As in Example 1, a gaseous mixture of propylene, ammonia, oxygen, steam and nitrogen (1.0:1.2:3.0:3.8:7.0 in molar ratio) is contacted with the above-obtained catalyst composition (8.0 ml.) at 390° C. at a space velocity of 435 hr.$^{-1}$, whereby acrylonitrile is produced. The conversion of propylene is 90%, and the selectivities to acrylonitrile, carbon monoxide and carbon dioxide are respectively 51%, 11% and 16%.

What is claimed is:

1. A catalyst composition comprising a catalyst system of the formula: $Tl_aP_bMo_cFe_dBi_eX_fO_g$ wherein X is Ni, Mg, Co or mixtures thereof and $a$, $b$, $c$, $d$, $e$, $f$, and $g$ represent, respectively, the number of atoms and $c$ is 12, $a$ is 2 or less, but not 0; $b$ is 0 to 5; $d$ is 0.1 to 5; $e$ is 0.1 to 5; $f$ is 2 to 15; and $g$ is from 38.3 to 81.5.

2. A catalyst composition according to claim 1, wherein $a$ is 0.01 to 1.0, $b$ is 0.01 to 3.0, $d$ is 0.1 to 5, $e$ is 0.5 to 3.0, $f$ is 2 to 12, and $g$ is from 38.9 to 69.0.

3. A catalyst composition according to claim 1, wherein said catalyst composition is incorporated with a carrier selected from the group consisting of silica, alumina, silicon carbide and titanium oxide.

4. A catalyst composition according to claim 3, wherein the amount of the carrier is less than 90% by weight of said catalyst composition.

5. A catalyst composition according to claim 3, wherein the amount of the carrier is from 5 to 90% by weight of said catalyst composition.

References Cited

UNITED STATES PATENTS

| 2,995,528 | 8/1961 | Dowden et al. | 252—464 |
| 3,102,147 | 8/1963 | Johnson | 252—437 X |
| 3,157,688 | 11/1964 | Arnold et al. | 252—437 X |
| 3,254,110 | 5/1966 | Sennewald et al. | 252—437 X |
| 3,576,764 | 4/1971 | Yamaguchi et al. | 252—437 |

PATRICK P. GARVIN, Primary Examiner

U.S. Cl. X.R.

252—443, 455 R, 464; 260—465.3

UNITED STATES PATENT OFFICE
CERTIFICATE OF CORRECTION

Patent No. 3,746,656     Dated   July 17, 1973

Inventor(s) Shiraishi, et al

It is certified that error appears in the above-identified patent and that said Letters Patent are hereby corrected as shown below:

Column 4, line 11, before "Example", insert --in--.

Column 4, line 16, change "N", first occurrence, should read -- P --.

Column 4, line 16, change "$Fe_{8.0}$" to --$Fe_{0.8}$--.

Column 5, line 10, change "$O_{50.4}$" to --$O_{47.7}$--.

Signed and sealed this 26th day of March 1974.

(SEAL)
Attest:

EDWARD M. FLETCHER, JR.          C. MARSHALL DANN
Attesting Officer                Commissioner of Patents